(12) United States Patent
Haschke et al.

(10) Patent No.: US 7,641,542 B2
(45) Date of Patent: Jan. 5, 2010

(54) NET RUCKING APPARATUS AND METHOD

(75) Inventors: Eggo Haschke, Deerfield, IL (US); Robert Pinto, Chicago, IL (US)

(73) Assignee: Precitec Corporation, Mundelein, IL (US)

( * ) Notice: Subject to any disclaimer, the term of this patent is extended or adjusted under 35 U.S.C. 154(b) by 0 days.

(21) Appl. No.: 12/051,307

(22) Filed: Mar. 19, 2008

(65) Prior Publication Data

US 2008/0248735 A1  Oct. 9, 2008

Related U.S. Application Data

(60) Provisional application No. 60/895,615, filed on Mar. 19, 2007.

(51) Int. Cl.
*A22C 11/00* (2006.01)
(52) U.S. Cl. ...................................................... 452/24
(58) Field of Classification Search .................. 452/22, 452/30–32, 34, 35, 37, 40, 46, 48, 51; 53/417, 53/138.1–138.4, 567, 576
See application file for complete search history.

(56) References Cited

U.S. PATENT DOCUMENTS

| | | | | |
|---|---|---|---|---|
| 3,477,860 | A * | 11/1969 | Sartore | 452/43 |
| 3,703,065 | A | 11/1972 | Soodalter | |
| 3,805,480 | A * | 4/1974 | Cherio et al. | 53/64 |
| 3,908,336 | A * | 9/1975 | Forslund | 53/576 |
| 4,016,704 | A * | 4/1977 | Fujio | 53/399 |
| 4,133,164 | A * | 1/1979 | Mintz | 53/261 |
| 4,170,097 | A * | 10/1979 | Floet et al. | 53/567 |
| 4,910,034 | A | 3/1990 | Winkler | |
| 4,924,552 | A | 5/1990 | Sullivan | |
| 4,958,477 | A | 9/1990 | Winkler | |
| 5,273,481 | A | 12/1993 | Sullivan | |
| 6,263,643 | B1 | 7/2001 | Kovacs et al. | |
| 6,845,600 | B2 * | 1/2005 | Hannen et al. | 53/459 |
| 7,051,415 | B2 * | 5/2006 | Pinto et al. | 29/455.1 |

(Continued)

OTHER PUBLICATIONS

International Search Report and the Written Opinion of the International Searching Authority, received Aug. 6, 2008 in co-pending PCT application.

*Primary Examiner*—Thomas Price
(74) *Attorney, Agent, or Firm*—Trexler, Bushnell, Giangiorgi, Blackstone & Marr, Ltd.

(57) ABSTRACT

An apparatus and a method for rucking netting onto a tube are described. The apparatus, in a first embodiment, comprises a frame having an axis, a passage along the axis, means for reciprocating movement along the axis, a netting tube releasably attachable to the means for reciprocating movement, a second tube comprising a frustum having a bore, the second tube being slidable co-axially to the netting tube, an annular space defined by the second tube and the netting tube, and spring-loaded fingers attached to the frame and extending into the passage. In another embodiment, a method for rucking netting onto a tube comprises attaching a netting tube to a moveable platform, mounting a second tube axially over the netting tube, the second tube comprising a frustum having a bore therethrough, placing an end of a netting over the second tube, forming an annular space between the netting tube and the second tube, and moving the second tube reciprocatingly through spring-loaded fingers. The second tube is a frusto-conical shape, a frusto-pyramidal shape, or another frustum shape

14 Claims, 8 Drawing Sheets

U.S. PATENT DOCUMENTS 7,441,386 B2 * 10/2008 Pinto et al. ................. 53/138.2
2005/0126403 A1    6/2005 Lopez
2005/0281924 A1   12/2005 Lopez

* cited by examiner

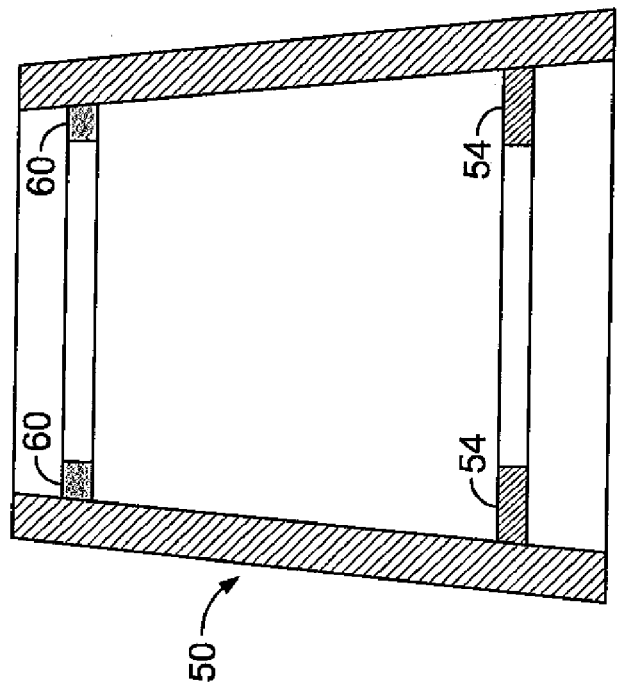
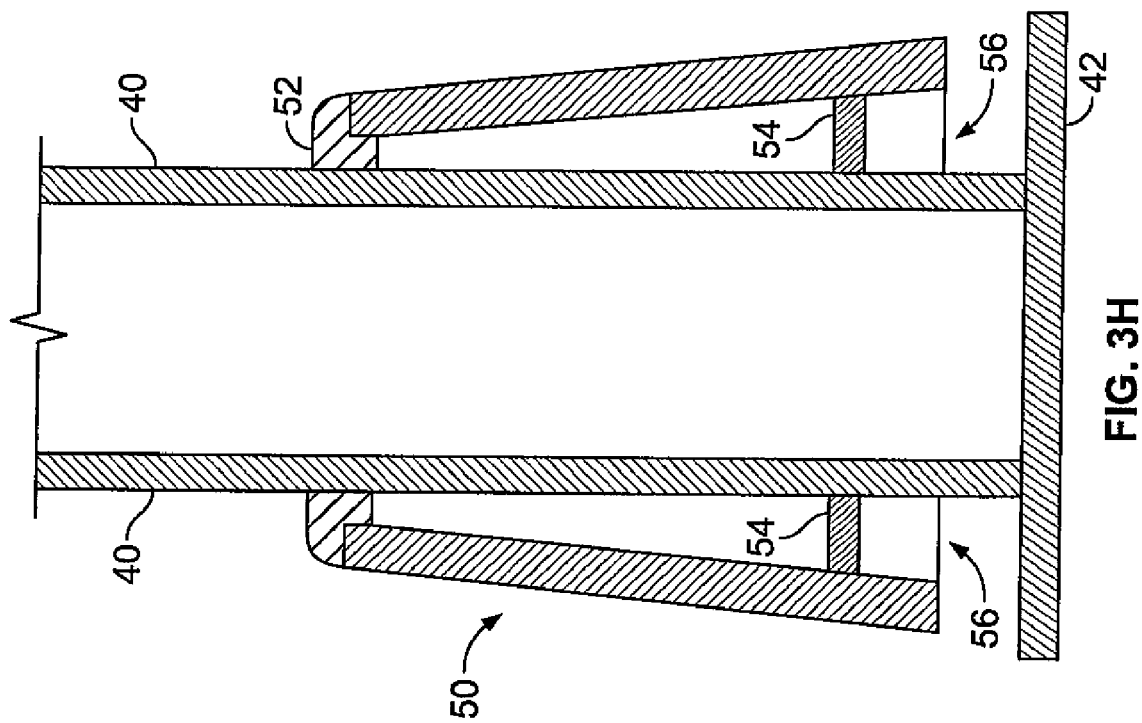

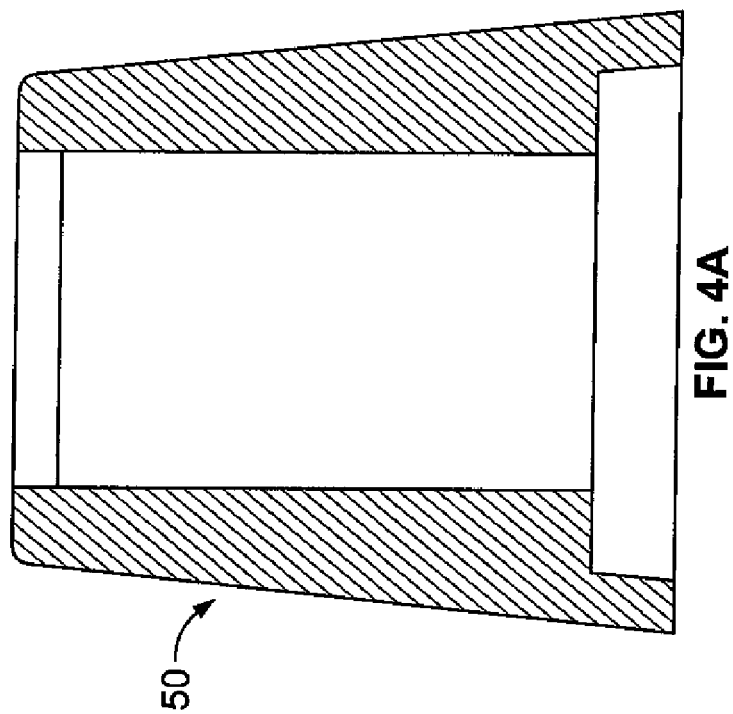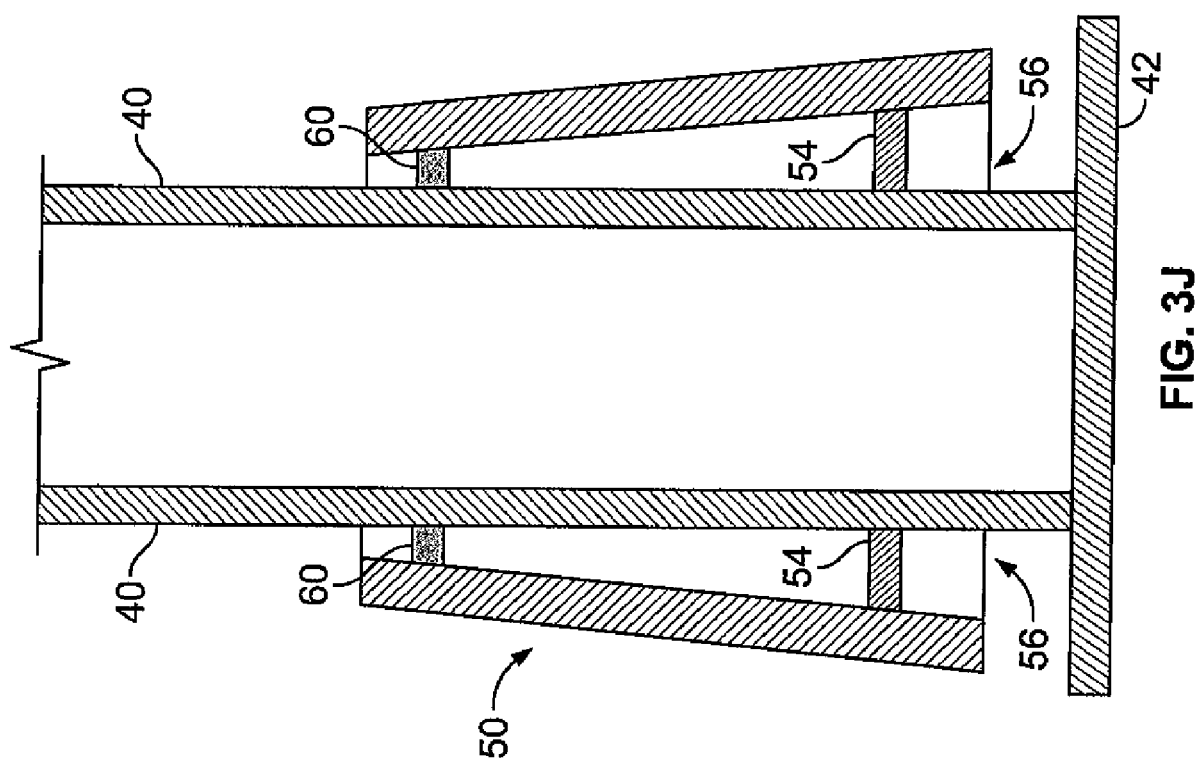

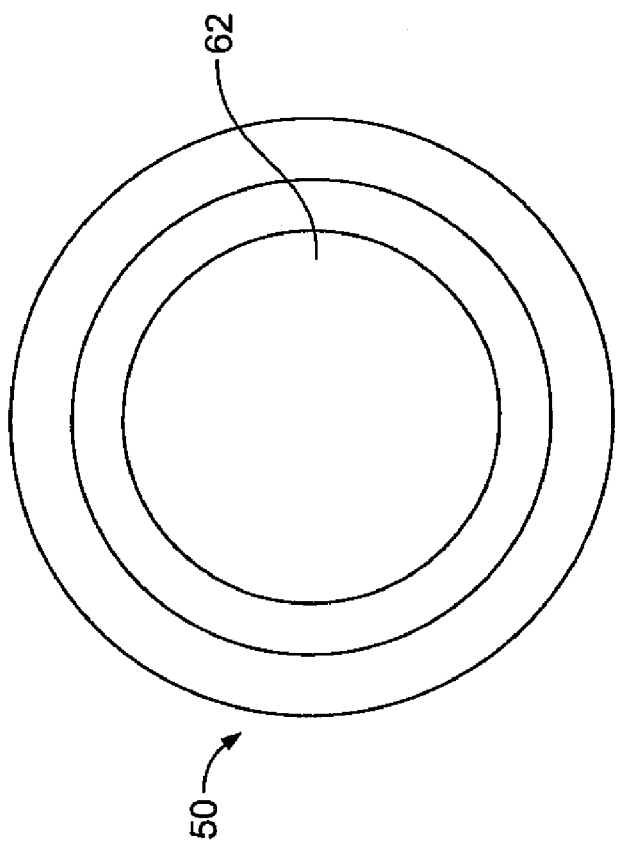
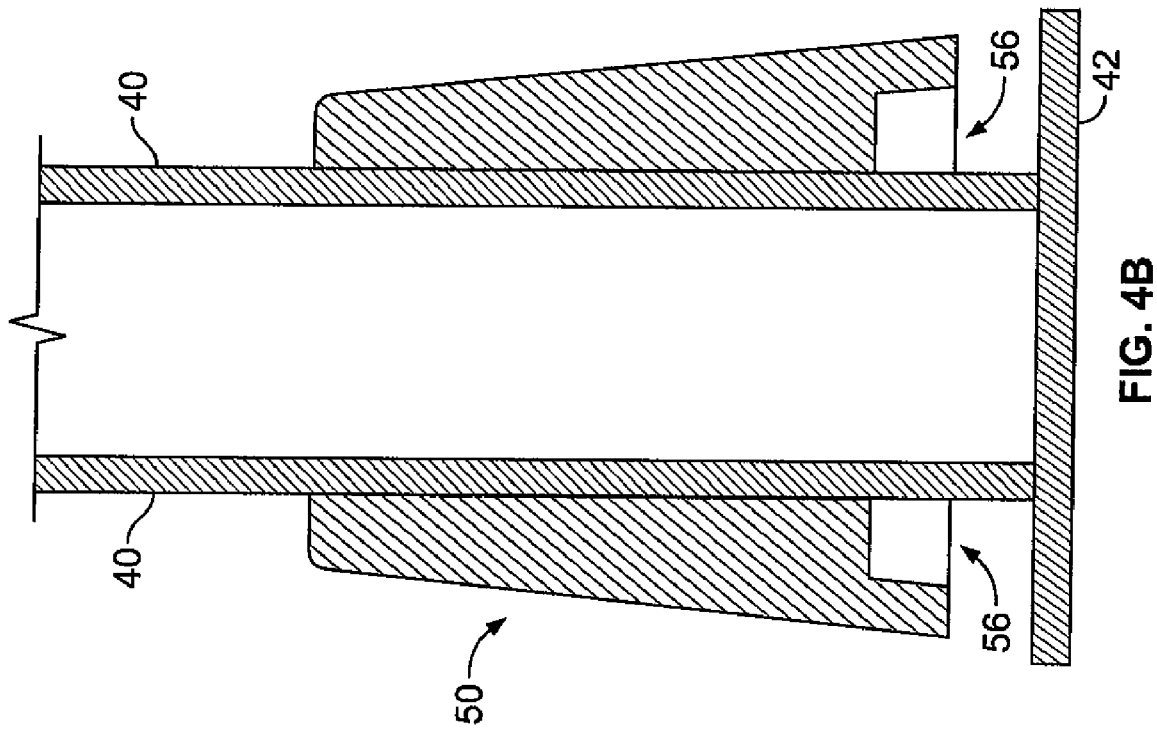

NET RUCKING APPARATUS AND METHOD

CROSS-REFERENCE TO RELATED APPLICATION

This application claims priority from U.S. Provisional Patent Application No. 60/895,615, filed Mar. 19, 2007, the disclosure of which is incorporated herein by reference.

BACKGROUND OF THE INVENTION

This invention relates to the field of preparing food products in shirred, tubular casings and enclosing the products in netting. One method generally used in the industry is to pump food products, such as sausage meat, whole muscle meats, or otherwise, through a product horn. The meat products are forced into an edible film and then into netting. The food products to be packaged will expand and push the film through the netting. After processing, such as smoking or cooking, the netting will be removed, leaving a dimpled appearance on the food products that is considered pleasing to consumers. The edible casing will prevent the netting from sticking to the meat, so upon removal of the netting a clean appearance of the meat is maintained. (There is no reason why the invention is limited to meat; it can be used for cheese or vegetarian sausage or anything else for which a dimpled appearance is desired.) This method is illustrated in U.S. Pat. No. 4,910,034 to Winkler, Process for the Production of Meat Products, and its divisional, U.S. Pat. No. 4,958,477, the disclosures of both of which are incorporated herein. As can be seen from FIG. 4 of those two patents, there are three coaxial tubes. The sausage meat or other ingredient is pumped into the smallest diameter tube; the middle tube forms the edible casing into a tube; and the outer tube (the "netting tube") holds the netting.

The tubular netting used in this process arrives from the manufacturers in a flattened state and wrapped circumferentially on a disposable cylinder. In order to be used as described above, the netting has to be shirred onto a temporary netting tube. This shirring process, or "rucking", involves placing the netting coaxially onto the netting tube. There is an advantage to being able to maximize the amount of netting placed on the netting tube, in that downtime to change or to reload netting tubes causes disruptions and inefficiencies in the process. Once the netting has been shirred onto the netting tube, the tube is placed on a sausage making machine for extrusion of sausage, as described in the '034 and '477 patents and as illustrated in, for example, FIG. 7 of those patents.

In the prior art, to ruck netting onto a netting tube, the netting tube is caused to reciprocate vertically, such as by use of an air cylinder. The netting is stretched over the tube. A plurality of spring-loaded fingers secured to a bracket surround the netting tube circumferentially. These fingers are normally in a horizontal position. Downward force moves them down; the springs cause them to snap back to the normal horizontal position when the force is removed. Accordingly, the fingers carry the netting downward during the upward stroke of the tube, and slide over the netting during the downward stroke of the tube. The reciprocating motion of the netting tube therefore causes the netting to be shirred onto the netting tube. This prior art is described in, for example, U.S. Pat. No. 5,273,481 to Sullivan, Net Rucker, the disclosure of which is incorporated herein. Note that only one layer of netting is shirred onto the netting tube by this method.

A prior art improvement is to add a second tube, which fits coaxially over the netting tube. The netting is stretched over the second tube. As the netting is carried over the second tube, the second tube rises in relation to the netting tube and the netting is shirred onto the netting tube, in the space between the base of the netting tube and the now-rising second tube. More netting can be shirred onto the netting tube in this manner, as compared to the prior art method of the previous paragraph, because multiple layers can be shirred, thereby rucking more linear feet of netting per length of netting tube. However, the netting is not shirred particularly neatly by this method. It bunches up and is wavy. The generally unkempt appearance of the netting on the tube is displeasing to prospective purchasers of the equipment. Additionally, and more importantly, the lack of neatness, caused as it is by a lack of uniformity, prevents shirring as much netting onto the tube as may be hoped for.

This prior art improvement used a second tube with a larger inside diameter than the outside diameter of the netting tube. Accordingly, a tube cap is inserted into the top of the second tube, to keep the second tube moving coaxially to the netting tube, and to allow the netting to slide smoothly over the second tube. A coaxial ring in the bottom of the second tube keeps the second tube coaxial to the netting tube, and will push the netting downward on the netting tube.

Although this prior art improvement increases the amount of netting that can be rucked onto a netting tube, further increases in this amount are desirable to users of the apparatus. Additionally, newly-developed devices attach to the output end of the netting tube during sausage making and allow the netting to slide off the netting tube in discrete, predetermined lengths, such as U.S. patent application Ser. No. 11/553,757, Apparatus and Method For Forming Tubes In Nets, filed Oct. 27, 2006, the disclosure of which is incorporated herein. These newly-developed net deruckers require a clear space on the end of the netting tube, a space greater than the length of sausages to be made, further limiting the amount of netting that can be rucked onto the netting tube. Accordingly, the use of a net derucker further increases the need for maximizing the amount of netting that can be rucked onto a netting tube of given length. (Please note that more netting can be rucked onto a netting tube simply by increasing the size of the netting tube, but this option is not available or, at best, is impractical, for users with limited space.)

One solution has been to provide an annular space defined by the tube ring, the netting tube, and the second tube, as described in U.S. Pat. No. 7,051,415 to Pinto, Net Rucking Apparatus and Method, the disclosure of which is incorporated herein. This solution works well but there is always a need for rucking more netting onto a tube and for rucking the netting more neatly onto a tube. The present invention meets this need.

BRIEF SUMMARY OF THE INVENTION

Briefly, and in accordance with the foregoing, an apparatus for rucking netting onto a tube, in a first embodiment, comprises a frame having an axis, a passage along the axis, means for reciprocating movement along the axis, a netting tube releasably attachable to the means for reciprocating movement, a second tube comprising a frustum having a bore, the second tube being slidable co-axially to the netting tube, an annular space defined by the second tube and the netting tube, and spring-loaded fingers attached to the frame and extending into the passage. In another embodiment, a method for rucking netting onto a tube comprises attaching a netting tube to a moveable platform, mounting a second tube axially over the netting tube, the second tube comprising a frustum having a bore therethrough, placing an end of a netting over the second tube, forming an annular space between the netting tube and the second tube, and moving the second tube reciprocatingly through spring-loaded fingers. The second tube comprises a frustum having a bore therethrough, and can be a frusto-conical shape, a frusto-pyramidal shape, or another frustum shape.

BRIEF DESCRIPTION OF SEVERAL VIEWS OF THE DRAWINGS

FIG. 3H is a side cross-sectional view of the netting tube, second tube, tube cap ring, and lower tube ring of the apparatus of FIG. 1.

FIG. 3I is a side cross-sectional view of another embodiment of the second tube.

FIG. 3J is a side cross-sectional view of the second tube of FIG. 3I mounted on the netting tube of the apparatus of FIG. 1.

FIG. 4A is a side cross-sectional view of another embodiment of the second tube.

FIG. 4B is a side cross-sectional view of the second tube of FIG. 4A, mounted on the netting tube of the apparatus of FIG. 1.

FIG. 4C is a top view of the second tube of FIG. 4A.

DETAILED DESCRIPTION OF THE PREFERRED EMBODIMENTS OF THE INVENTION

Figure 1:
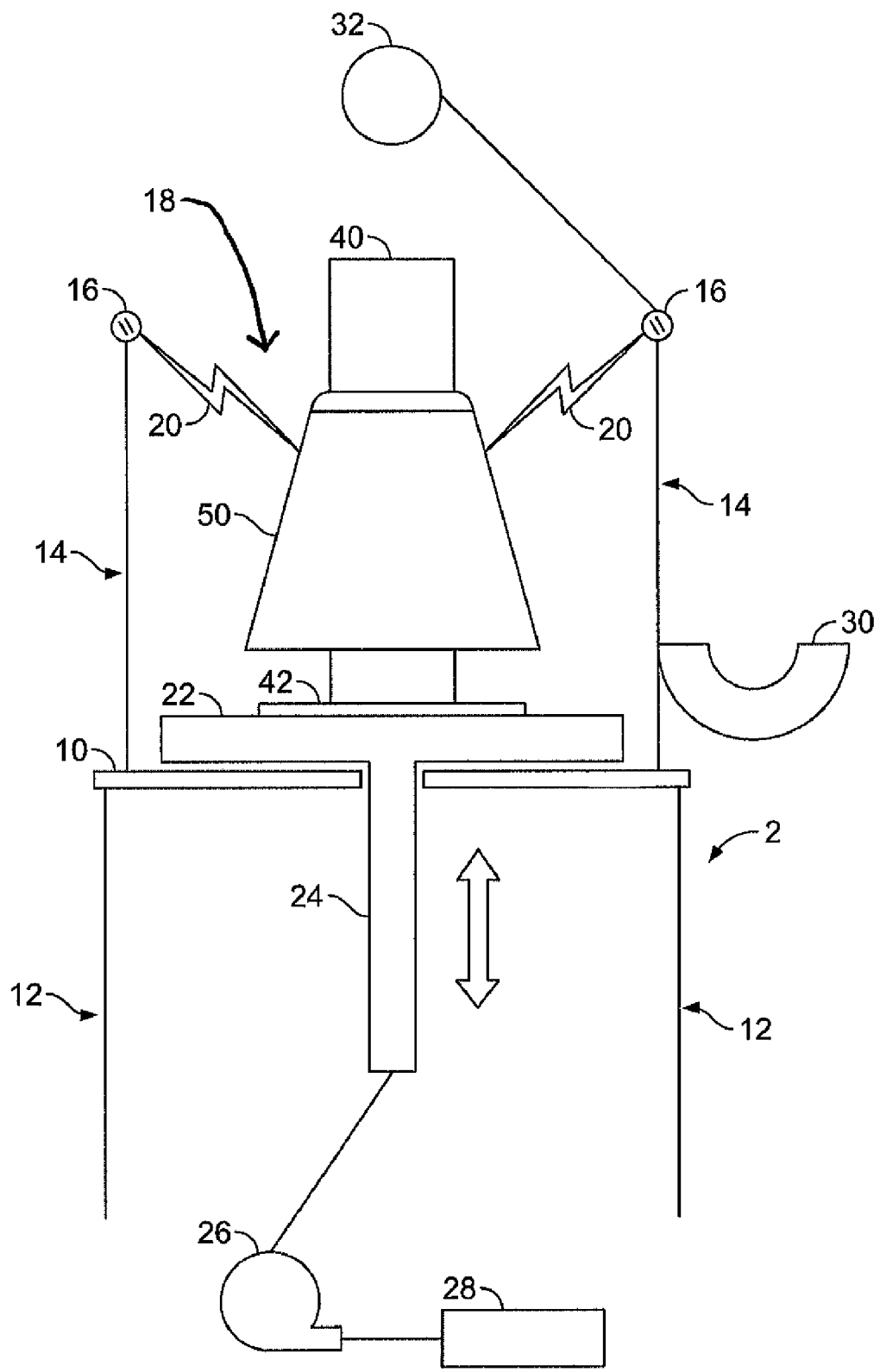
FIG. 1 is a diagrammatic view of the apparatus of the preferred embodiment of the present invention, without any netting in place.
Figure 1A:
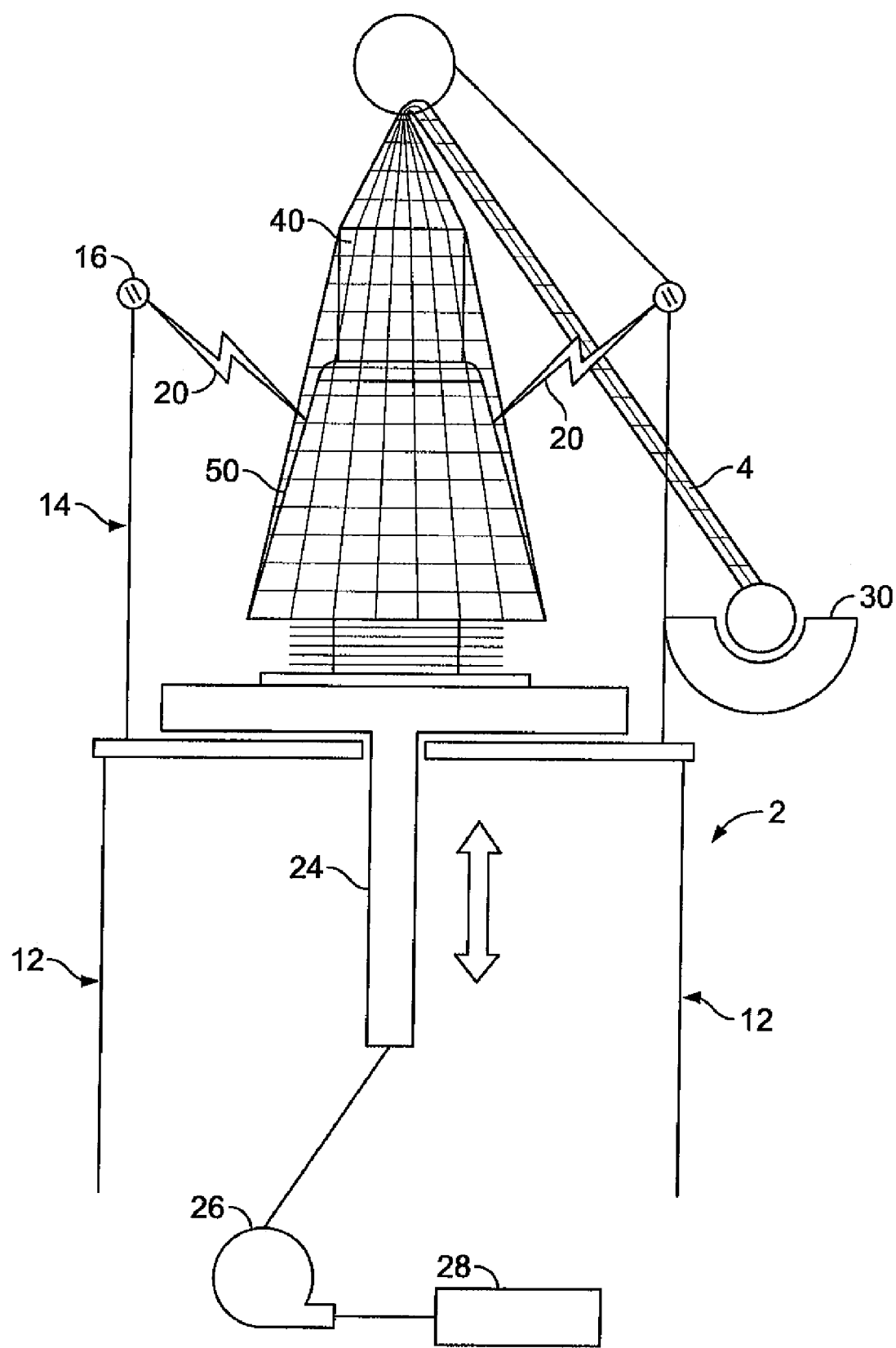
FIG. 1A is the apparatus of FIG. 1, with the netting shown.

The organization and manner of the preferred embodiments of the invention, together with further objects and advantages thereof, may best be understood by reference to the following description of the preferred embodiments of the invention, taken in connection with the drawings:

The preferred embodiment of the net rucking apparatus 2 is shown in elevation view in FIG. 1 without the netting 4 present, and in FIG. 1A with netting 4 present. The apparatus 2 comprises a frame 10, a netting tube 40, and a second tube 50. The frame 10 has legs 12 to support it, and upper arms 14 that hold a net rucker head 16. The net rucker head 16 defines a passage 18 through which the netting tube 40 and second tube 50 pass. Attached to the net rucker head 16 and extending into the passage 18 is a plurality of spring-loaded fingers 20.

A moveable platform 22 sits on top of the frame 10. It is configured to travel in an upward and downward direction, powered by a lifting means. In the preferred embodiment, the lifting means comprises a reciprocating air-actuated cylinder 24, connected to an air supply 26 which is controlled by a control means 28. In other embodiments, other lifting means that can provide reciprocating axial action are used, such as a gear arrangement, another type of hydraulic cylinder, or a treadle. In the preferred embodiment, control means 28 is a microprocessor with an application-specific program written to it. In other embodiments, a digital or analog controller is used. In yet other embodiments, apparatus 2 is controlled manually.

Netting 4 is placed in a net tray 30 that is attached to an upper arm 14. The leading edge of the netting 4 travels up to a net guide 32, attached to and above one of the upper arms 14 and above the net rucker head 16. The net guide 32 leads the netting 4 down through the passage 18 as will hereinafter be described.

Figure 2:
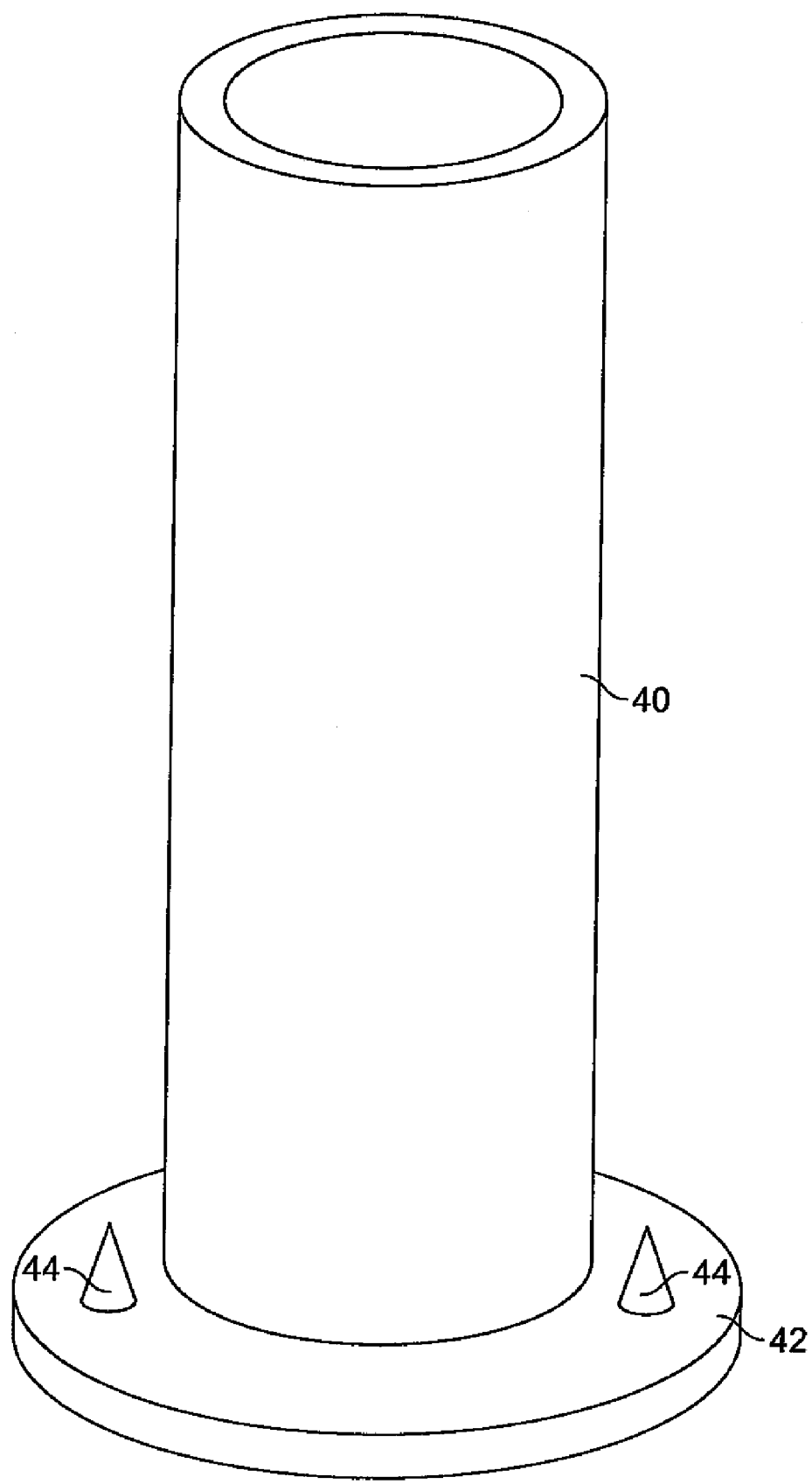
FIG. 2 is a perspective view of the netting tube of the apparatus of FIG. 1.

Netting tube 40, shown enlarged in FIG. 2, is a hollow cylinder with a base plate 42. In the preferred embodiment, netting tube 40 is stainless steel, for use in a food-processing environment. There are attachment means 44 on baseplate 42, to hold netting tube 40 securely to moveable platform 22. Attachment means 44 are preferably identical to the means by which netting tube 40 will be attached to a sausage-making machine after rucking of the netting 4. Attachment means 44 is preferably a locking clamp. In other embodiments, attachment means is a nut-and-bolt arrangement, a bayonet attachment, a threading system, or any system to hold netting tube 40 firmly to moveable platform 22.

Second tube 50 is a hollow member in the shape of a frustum, the basal part of a solid cone or pyramid formed by cutting off the top by a plane parallel to the base. In a first embodiment, second tube 50 preferably has a frusto-conical shape. Accordingly, second tube 50 has a circular cross-section taken perpendicular to the axis of second tube 50. In other embodiments, second tube 50 has a frusto-pyramidal shape. In these embodiments, second tube has flat, trapezoidal faces, so that a cross-section taken perpendicular to the axis is polygonal. In other embodiments, a cross-section will have another shape, such as oval. Preferably, second tube 50 is made of a heavy plastic, to allow netting 4 to slide over it easily.

Second tube 50, being a tube, has a bore therethrough. In the illustrated embodiment shown in FIGS. 3A through 3G, second tube 50 has a frusto-conical shape and the bore matches the frusto-conical shape of the outside of second tube 50. In other embodiments, second tube 50 has a frusto-pyramidal shape and the bore matches the frusto-pyramidal shape of the outside of second tube 50. In yet other embodiments, the outside of second tube 50 has one of a frusto-conical shape and a frusto-pyramidal shape, and the bore has the other of a frusto-conical shape and a frusto-pyramidal shape.

Figure 3A:
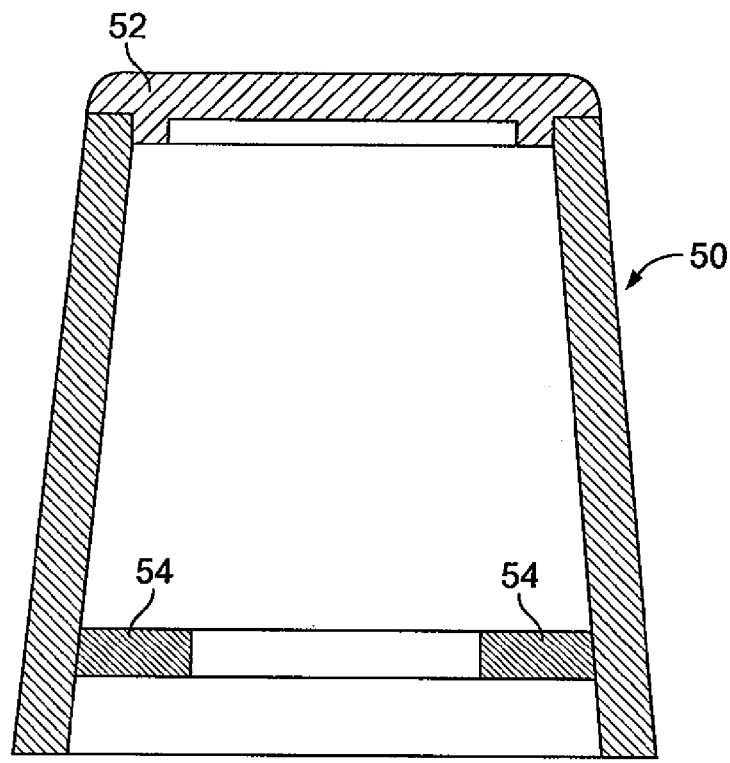
FIG. 3A is a side cross-sectional view of the second tube of the apparatus of FIG. 1.
Figure 3B:
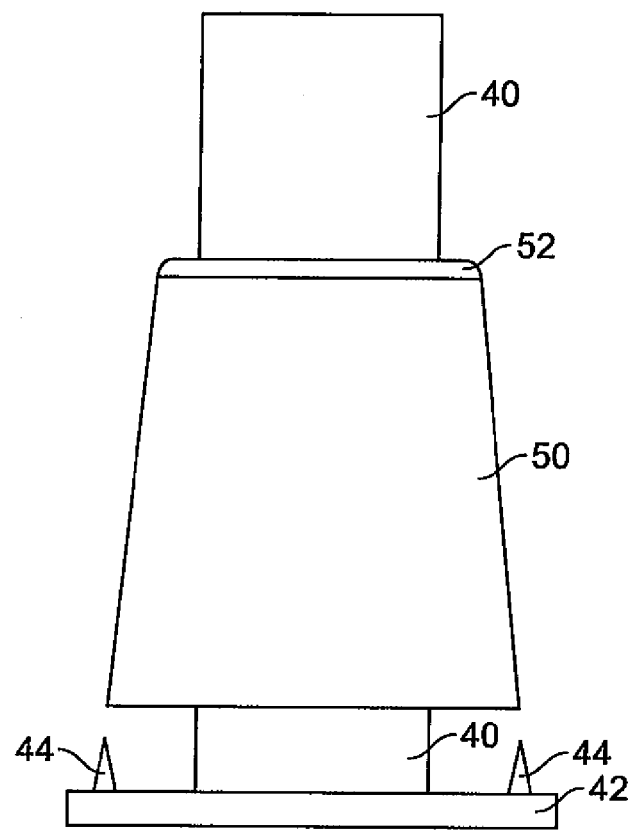
FIG. 3B is a side view of the second tube of FIG. 3A.
Figure 3C:
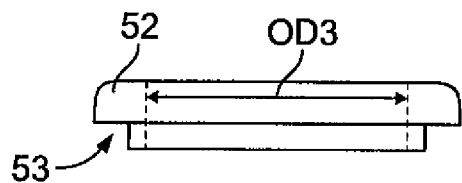
FIG. 3C is a side view of the tube cap ring of the apparatus of FIG. 1.
Figure 3D:
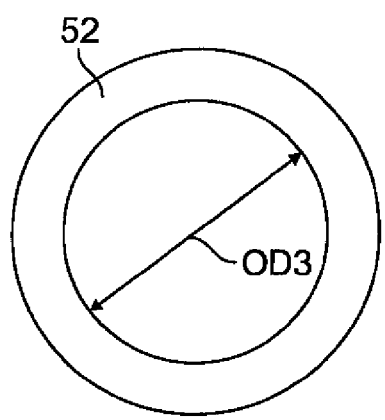
FIG. 3D is a top view of the tube cap ring of FIG. 3C.
Figure 3E:
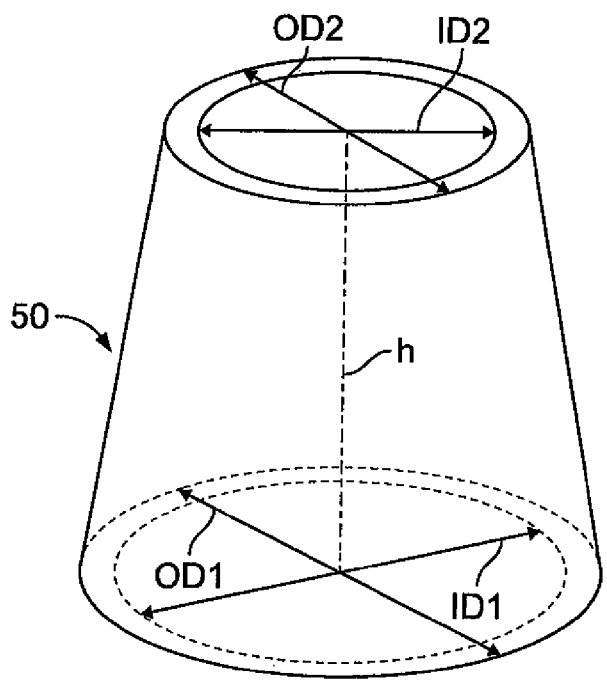
FIG. 3E is a perspective view of the second tube of FIG. 3B.

A first embodiment of second tube 50 is shown in FIGS. 3A through 3H. Second tube 50, as shown in FIG. 3E, has a circular cross section taken perpendicular to the axis of second tube 50. Accordingly, second tube 50 has an inner diameter ID1 at the bottom, an outer diameter OD1 at the bottom, an inner diameter ID2 at the top, and an outer diameter OD2 at the top. Second tube has a height h.

In this embodiment, second tube 50 has a tube cap ring 52 affixed to the top. Tube cap ring 52 is a toroidal element with a notched edge 53, as shown in FIG. 3C, so that it has one outer diameter equal to OD2 of second tube 50, and a second outer diameter equal to ID2 of second tube 50, allowing the tube cap ring 52 to snap onto the top end of the second tube 50. Tube cap ring 52 preferably fits into second tube 50 with an interference fit. In other embodiments, tube cap ring 52 is attached to second tube 50 by glue, welding, threads, or fasteners such as screws, rivets, or bolts. In yet another embodiment, tube cap ring 52 is formed integrally with second tube 50.

Tube cap ring 52 has an inner diameter ID3 just slightly larger than the outer diameter of netting tube 40, as shown in FIG. 3D, so that tube cap ring 52 can slide easily co-axially to netting tube 40. Tube cap ring 52 is rounded or at least angled on the side opposite the notched edge, to allow netting 4 to slide over it easily, as the purpose of tube cap ring 52 is to prevent snagging. In this embodiment, tube cap ring is circular in cross section taken perpendicular to the axis of second tube 50 when tube cap ring is affixed to second tube 50. In other embodiments, tube cap ring 52 has a polygonal cross section to match the frusto-pyramidal shape of second tube 50. In other embodiments, tube cap ring 52 has a one of a circular cross section and a polygonal cross section on its outside, to match the outer shape of second tube 50, and the other of a circular cross section and a polygonal cross section on its inside, to match the shape of the bore of second tube 50.

Figure 3F:
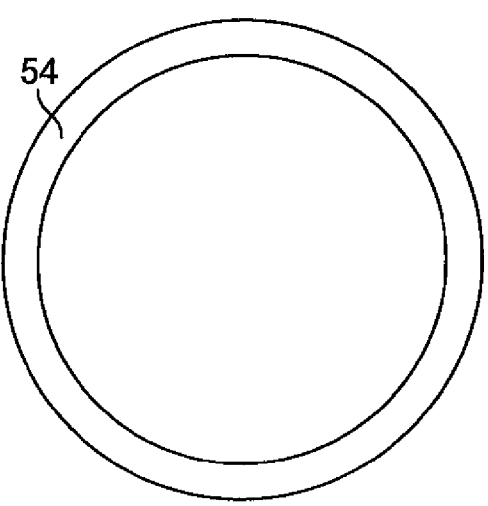
FIG. 3F is a top view of the lower tube ring of the apparatus of FIG. 1.
Figure 3G:
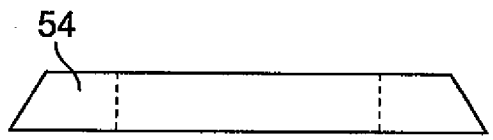
FIG. 3G is a side view of the lower tube ring of FIG. 3F.

A lower tube ring 54, shown in FIGS. 3A, 3F, and 3G, is also of a toroidal shape and is placed inside and coaxially to the second tube 50. Lower tube ring 54 has an outer diameter equal to the inner diameter of second tube 50 at a point just above the bottom of second tube 50. In the preferred embodiment, lower tube ring 54 has a slanted outside wall, having the same slope as second tube 50. Lower tube ring 54 is attached to second tube 50 a short distance, preferably an inch, from the bottom of second tube 50. Accordingly, lower tube ring 54 forms an interference fit inside second tube 50, so that lower tube ring 54 stays firmly situated inside second tube 50, as shown in cross-section in FIGS. 3A and 3H. In another embodiment, lower tube ring 54 is attached to second tube 50 by glue, welding, threads, or fasteners such as screws, rivets, or bolts. In yet another embodiment, lower tube ring 54 is formed integrally with second tube 50.

The inner diameter of lower tube ring 54 is, like tube cap ring 52, just slightly larger than the outer diameter of netting tube 40, so that lower tube ring 54 can easily slide axially to netting tube 40, as shown in elevation view in FIG. 3B and in partial cutaway cross-sectional view in FIG. 3H. Because lower tube ring 54 is placed a short distance from the bottom end of the second tube 50, an annular space 56 is defined by netting tube 40, lower tube ring 54, and second tube 50, as shown in FIG. 3H. When tube cap ring 52 and lower tube ring 54 are put in place on second tube 50, tube cap ring 52 and lower tube ring 54 slide easily along netting tube 40, so that second tube 50 travels coaxially to netting tube 40.

In this illustrated embodiment, having a tube cap ring 52, only a single lower tube ring 54 is necessary. In other embodiments, extra tube rings are placed inside second tube 50. One such other embodiment is shown in FIGS. 3I and 3J. In this embodiment, lower tube ring 54 is used, as described above, to allow second tube 50 to move coaxially along netting tube 40 and to form annular space 56. Please note that second tube 50 in this embodiment has rounded edges at its top to prevent snagging of netting. An upper tube ring 60, substantially identical to lower tube ring 54 except smaller, is also mounted within second tube 50. Like lower tube ring 54, upper tube ring 60 has a toroidal shape. It has an inner diameter just larger than the outer diameter of netting tube 40 and an outer diameter equal to the inner diameter of second tube 50 at a point at or just below the top of second tube 50. Like lower tube ring 54, upper tube ring 60 preferably has a slanted outside wall, having the same slope as second tube 50. Upper tube ring 60 therefore forms an interference fit inside second tube 50, so that upper tube ring 60 stays firmly situated inside second tube 50, as shown in cross-section in FIG. 3G. In another embodiment, upper tube ring 60 is attached to second tube 50 by glue, welding, threads, or fasteners such as screws, rivets, or bolts. In yet another embodiment, upper tube ring 60 is formed integrally with second tube 50.

In other embodiments, lower tube ring 54 and upper tube ring 60, rather than being toroidal, have a polygonal shape in cross section taken perpendicular to second tube 50, to match the shape of the bore of second tube 50. In these embodiments, lower tube ring 54 and upper tube ring 60 still have a circular inner diameter to match netting tube 40.

Another embodiment of second tube 50 is shown in FIGS. 4A, 4B, and 4C. In this embodiment, second tube 50 has a frusto-conical shape on the outside and a cylindrical bore 62 therethrough. Please note that second tube 50 in this embodiment has rounded edges at its top to prevent snagging of netting. Bore 62 has a diameter through most of its length slightly greater than the outer diameter of netting tube 40, so that second tube slides co-axially along netting tube 40. At the bottom, however, bore 62 increases in diameter, because of a notch in the bottom of second tube 50, to form annular space 56.

In another embodiment, second tube 50 has a frusto-pyramidal shape on the outside and cylindrical bore 62 therethrough.

The method of use of the apparatus 2 is substantially the same for the illustrated embodiments of second tube 50. Netting tube 40 is placed on moveable platform 22 and attached by attachment means 44. In a first embodiment, second tube 50, with its two rings 52, 54 in place, is mounted over netting tube 40. In another embodiment, second tube 50, with at least rings 54, 60 in place, is mounted over netting tube 40. In yet another embodiment, second tube 50 does not need rings, as described in connection with FIGS. 4A and 4B.

Moveable platform 22, by its reciprocating motion, causes netting tube 40, surrounded by second tube 50, to travel in a reciprocating, coaxial movement through passage 18. Spring-loaded fingers 20 are arranged so that they conform to the diameter of second tube 50 and netting tube 40. During downward travel of second tube 50 and netting tube 40, fingers 20 are pushed away circumferentially from tubes 40 and 50, allowing netting 4 to travel in a downward direction. When second tube 50 and netting tube 40 travel upward, spring-loaded fingers 20 snap back to engage netting 4 and prevent it from traveling.

Accordingly, in use netting 4 is placed in net tray 30 and the free end is run through net guide 32 and over second tube 50, to at least a point below fingers 20. As moveable platform 22 moves down, it pulls netting 4 down with it, past fingers 20. When reciprocating platform 22 reaches the bottom of its downstroke, cylinder 24 reverses movement to an upward direction, pushing netting tube 40 and second tube 50 through passage 18. Fingers 20 now engage netting 4 on second tube 50 and prevent it from traveling. Second tube 50 nevertheless continues in an upward path, as netting 4 can slide over the smooth plastic surface of second tube 50, so netting 4 moves downward relative to second tube 50. Thus, as moveable platform 22 reverses again in its reciprocating motion, netting 4 is pulled down toward the bottom of second tube 50. When netting 4 gets to the bottom of second tube 50, fingers 20 push netting 4 off second tube 50 and netting 4 contracts around the smaller-diameter netting tube 40. Accordingly, second tube 50 is forced slightly upward, relative to netting tube 40, fingers 20, as netting 4 is rucked onto the bottom of netting tube 40. On each upward stroke of moveable platform 22, more netting 4 is pushed by fingers 20 off second tube 50 and onto netting tube 40. Fingers 20 push netting 4 inward, causing it to fill annular space 56. Because of annular space 56, netting 4 is rucked neatly and several layers thick. Accordingly, apparatus 2 will ruck approximately four to five times as much netting 4 onto a given size of netting tube 40 as a conventional rucker without this annular space.

In yet another embodiment, fingers 20 are replaced by wheels. In this embodiment, the wheels are configured to rotate in only a single direction, and to lock in the opposite direction of rotation. Accordingly, as moveable platform 22 moves down, it pulls netting 4 down with it, as described above, past the wheels, which rotate freely in this direction. When reciprocating platform 22 reaches the bottom of its downstroke, cylinder 24 reverses movement to an upward direction, pushing netting tube 40 and second tube 50 through passage 18, as described above. The wheels now engage netting 4 on second tube 50 and, being locked to prevent rotation in this direction, prevent netting 4 from traveling. The operation of apparatus 2 is otherwise identical to the previously described embodiments.

While preferred embodiments of the present invention are shown and described, it is envisioned that those skilled in the art may devise modifications of the present invention without departing from the spirit and scope of the appended claims.

The invention claimed is:

1. An apparatus for rucking netting onto a tube, comprising:
 a frame having an axis;
 a passage along said axis;
 means for reciprocating movement along said axis;
 a netting tube releasably attachable to said means for reciprocating movement;
 a second tube having a top end and a bottom end, said bottom end proximate to said means for reciprocating movement and said top end distal to said means for reciprocating movement, said tube comprising a frustum having a bore, said frustum extending from said top end to said bottom end, said second tube being slidable co-axially to said netting tube;
 an annular space defined at least by said second tube and said netting tube; and
 spring-loaded fingers attached to said frame and extending into said passage.

2. The apparatus of claim 1, further comprising means to prevent snagging to a netting on said second tube.

3. The apparatus of claim 1, further comprising a tube cap attached to said second tube and having a tapered surface.

4. The apparatus of claim 1, further comprising means to control said means for reciprocating movement.

5. The apparatus of claim 1, whereby said means for reciprocating movement comprises an air-actuated cylinder and an air supply.

6. The apparatus of claim 1, wherein said annular space comprises a notch in an end of said second tube.

7. The apparatus of claim 1, wherein said annular space is formed by a tube ring, said second tube, and said netting tube, said tube ring being attached to said second tube within said bore of said second tube and slidable co-axially over said netting tube.

8. The apparatus of claim 7, further comprising a second tube ring within said bore of said second tube.

9. The apparatus of claim 1, wherein said frustum has a frusto-conical shape.

10. The apparatus of claim 1, wherein said frustum has a frusto-pyramidal shape.

11. A method of rucking netting onto a netting tube, comprising:
 attaching a netting tube to a moveable platform;
 mounting a second tube axially over said netting tube, said second tube comprising a frustum having a bore therethrough, said frustum extending from a top end of said tube to a bottom end of said tube;
 placing an end of a netting over said second tube;
 forming an annular space between said netting tube and said second tube; and
 moving said second tube reciprocatingly through spring-loaded fingers.

12. The method of claim 10, further comprising preventing snagging of said netting.

13. The method of claim 10, wherein said frustum has a frusto-conical shape.

14. The method of claim 10, wherein said frustum has a frusto-pyramidal shape.

\* \* \* \* \*